(No Model.) 2 Sheets—Sheet 1.
B. RIEDER.
Velocipede.
No. 234,064. Patented Nov. 2, 1880.
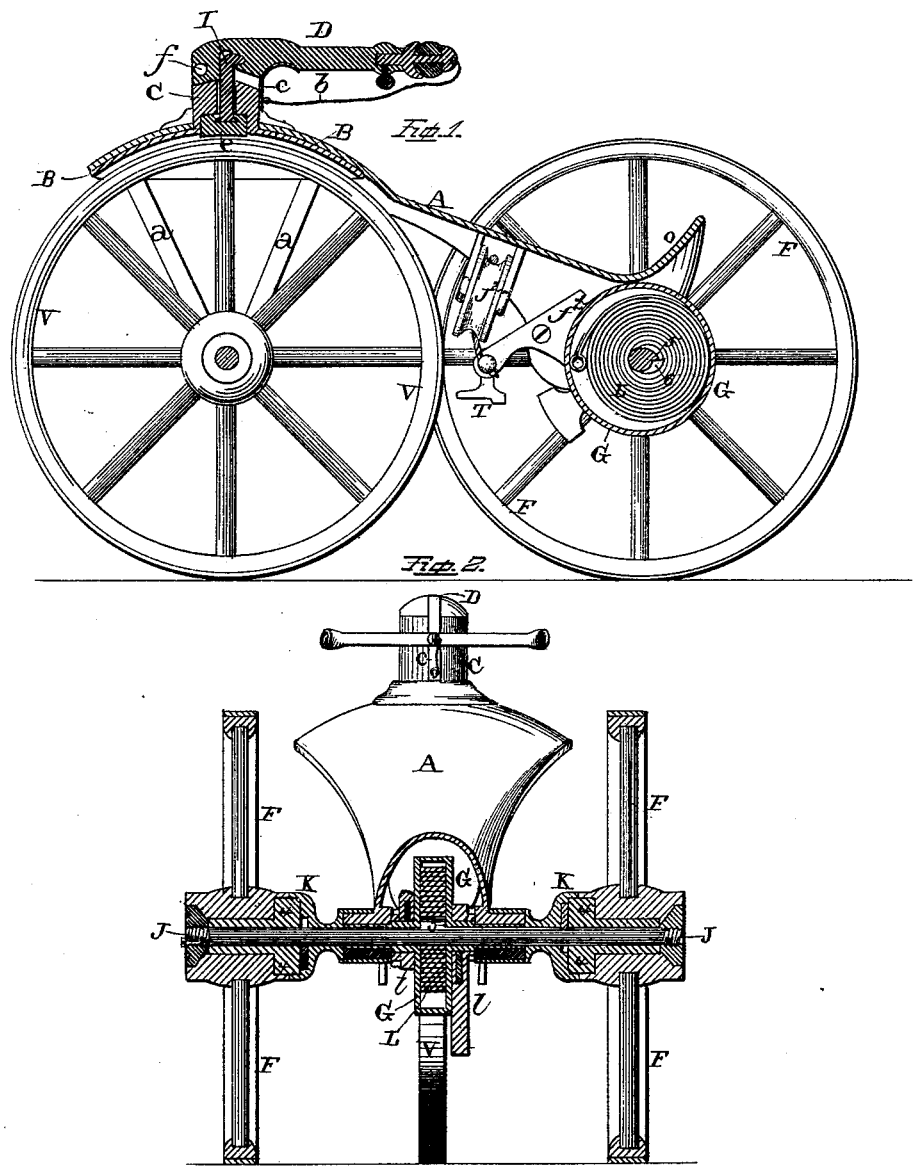
Witnesses:
W. W. Mortimer,
Will H. Kern.
Inventor:
B. Rieder,
per
F. A. Lehmann,
Atty.

(No Model.)
2 Sheets—Sheet 2.
B. RIEDER.
Velocipede.
No. 234,064.    Patented Nov. 2, 1880.
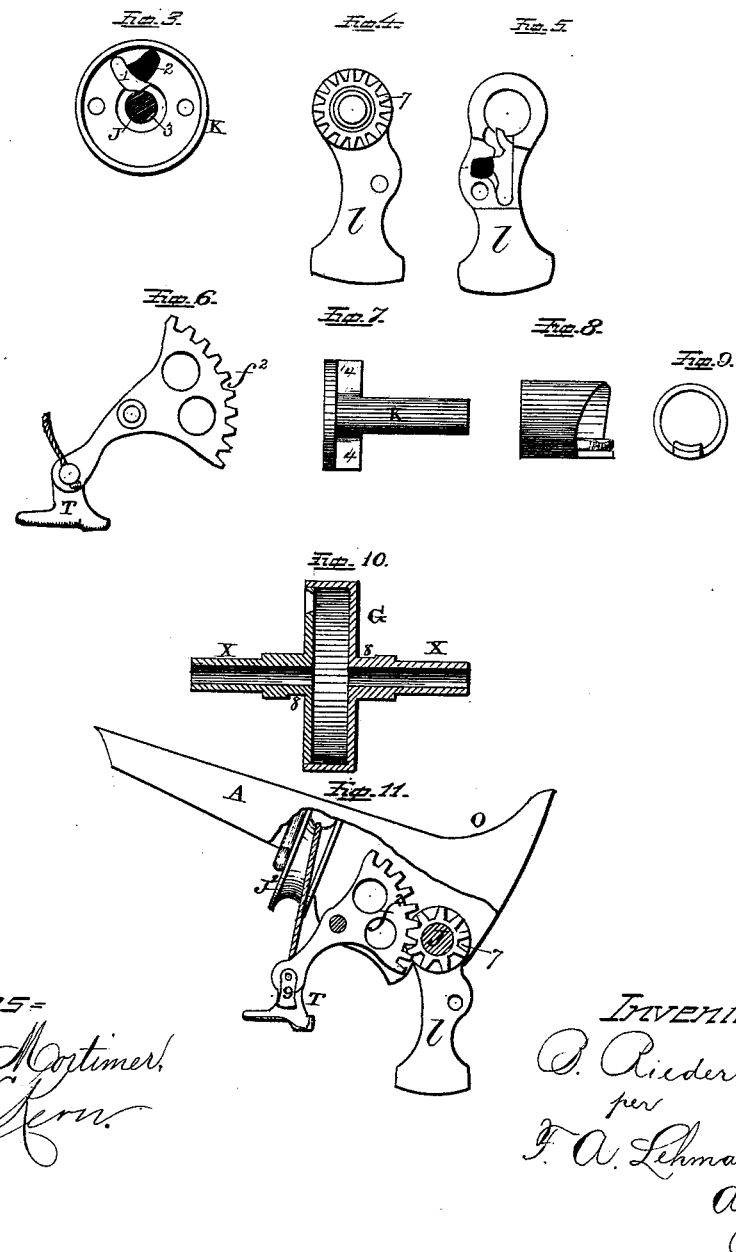
Witnesses=
W. W. Mortimer
Will. H. Kern
Inventor=
B. Rieder,
per
F. A. Lehmann,
Att'y.

UNITED STATES PATENT OFFICE.

BARTHOLOMA RIEDER, OF EMSWORTH, PENNSYLVANIA.

VELOCIPEDE.

SPECIFICATION forming part of Letters Patent No. 234,064, dated November 2, 1880.

Application filed July 26, 1880. (No model.)

*To all whom it may concern:*

Be it known that I, BARTHOLOMA RIEDER, of Emsworth, in the county of Allegheny and State of Pennsylvania, have invented certain new and useful Improvements in Velocipedes; and I do hereby declare the following to be a full, clear, and exact description of the invention, such as will enable others skilled in the art to which it pertains to make and use it, reference being had to the accompanying drawings, which form part of this specification.

My invention relates to an improvement in velocipedes; and it consists in an axle having a projection or catch formed upon it, in combination with a spring which is secured to its inclosing-drum at its outer end, and which has a projection formed on its inner end to engage with the catch on the axle when the axle is turned forward but not backward, and a suitable mechanism connected with the two treadles, whereby the spring is kept wound up, so as to propel the velocipede forward.

It further consists in the arrangement and combination of parts, which will be more fully described hereinafter.

Figure 1 is a vertical longitudinal section of a velocipede embodying my invention. Fig. 2 is a vertical section of the same, taken through the axle. Figs. 3 and 7 are detail views of the clutch which is applied to each one of the wheels on the axle for the purpose of enabling them to operate independently of each other. Figs. 4 and 5 are detached views of the clutches that are applied to the axle and operated by the treadles. Fig. 6 is a view of the segment that is attached to the treadle. Figs. 8 and 9 are detail views of the rings which are passed over the axle and keep the treadle and clutches in position. Fig. 10 is a vertical section of the drum in which the spring is placed. Fig. 11 is a side elevation of one of the treadles, the pulley, segment, and clutch placed on the axle.

A represents the seat-board, upon which the rider sits, and which is made wide and concave on its under side at the front end and narrow and convex at the rear end, where it terminates in the saddle O. This seat-board is made in one continuous casting, and is supported in front by a guiding-wheel, V, and at its rear end it rests directly upon the sleeves X, which project out from each side of the drum G.

The wheel V is journaled in the braces $a$, which project down upon each side of the wheel, and have their lower ends secured together for the purpose of receiving the axle, pivot, or journal upon which the wheel turns. The upper ends of these braces are secured to the under side of the concavo-convex plate B, which fits in the concave portion of the frame A. Upon the center of the top of this plate is formed the vertical post C, which has an opening through its center and a recess formed in its lower end. In this recess is placed a block, $e$, of any suitable material, which acts as a rubber or brake for the wheel V. Secured to the top of this brake, and extending up through the opening in the post, is a rod, I, which has its upper end bent so as to catch in the lever D, which lever is pivoted at $f$ to the post. Secured to the under side of this lever D, by means of which the guiding-wheel V is turned from side to side, is a suitable spring, $c$, which bears upon the side of the post C and keeps the lever D pressed constantly upward. Fastened to the lower end of this spring is a wire or cord, $b$, which extends out to the outer end of the lever D, and by means of which the spring can be drawn outward, so that it will no longer bear against the post C and thus let the lever drop downward. The outer end of this lever D extends back to within easy reach of the rider as he sits in the saddle O, and by bearing down upon this lever when he desires to check the speed of the velocipede the block $e$ is forced down upon the rim of the wheel V, so as to act as a brake.

The axle J, which supports the rear end of the velocipede, is provided with a driving-wheel, F, at each end, and each one of these wheels is provided with a clutch, by means of which they are made to turn with the axle as long as the axle is turning forward, but not when the axle is turning backward. As each one of these wheels is provided with a clutch of its own, it will readily be seen that they are independent of each other. The clutches K, by means of which these two wheels F are secured to the axle, are made in two parts, which are secured together, one of which is provided with a dog, 1, and a suitable spring, 2, which keeps the dog pressed constantly against the axle J. In one side of the axle, where these clutches K are applied to it, is made a slight recess, 3, in which the dogs catch when the axle is turned in one direction, but not in the other. The outer part of these clutches have suitable projections 4, which catch in the inner sides of the hubs of the driving-wheels, and thus bind the wheels and clutches rigidly together.

Upon the center of the axle is formed a projection or catch, 5, as shown in Figs. 1 and 2, and around this part of the axle is placed the coiled spring L, which spring is placed within the drum G. The outer end of this spring is secured to the drum, while the inner end of the spring is provided with a suitable projection, 6, to engage with the catch on the axle when the drum is moved in one direction; but when the drum is moved in the other direction this projection slips idly past the catch 5 on the axle. When the drum is turned toward the front of the machine this projection on the end of the spring catches against the catch on the axle and turns the axle forward, and all resistance on the part of the axle is utilized in winding the spring up inside of the drum, so that the effort of the spring to unwind itself will be exerted wholly in turning the axle around, and thus propelling the machine forward.

Projecting outward from each side of the drum G is a sleeve, X, upon which are placed the two weighted clutches $l$ in direct contact with the sides of the drum, and each clutch is provided with a dog and spring to engage with this sleeve, and on its outer side with a pinion, 7, to engage with the segment $f^2$. These sleeves have a recess, 8, cut in opposite sides, so that the dogs in the pawls will alternately engage therewith, and thus impart a constant movement to the drum as the treadles are alternately operated by the rider.

Pivoted in the inner sides of the vertical part of the frame A, which drops downward over and around the axle, are the two segments $f^2$, which have the treadles T pivoted to their lower ends, and which segments $f^2$ engage with the pinions 7 on the upper ends of the two weighted clutches $l$. These treadles T consist of the two pivoted parts, the lower one of which receives the pressure of the foot, while the upper one prevents the foot from being raised upward. By pivoting this upper piece, 9, of the treadle the rider can have his feet securely held against any vertical movement, and at the same time he can readily draw his feet outward when he desires to do so.

Journaled in suitable bearings which project down from the under side of the frame A is the pulley $J^2$, over which passes a cord, wire, or chain, for the purpose of connecting the two treadles together in such a manner that when one treadle is depressed the other one will be raised upward, so that its clutch can take a fresh hold upon the sleeve X of the drum G. By alternately operating these treadles the clutches $l$ are made to exert a constant force in turning the drum G upon the axle, and this turning motion of the drum G keeps winding up the spring, which exerts its whole pressure against the catch on the axle for the purpose of turning the axle around.

As already described above, the driving-wheels F are connected to the axle by means of the clutches K, so that as long as the axle is turned forward by the spring the wheels F are turned forward so as to propel the velocipede along.

Having thus described my invention, I claim—

1. The combination of an axle provided with a catch, a spring which is provided with a projection at its inner end to engage with the catch, and which is secured to the drum G at its outer end, with the drum G, provided with the sleeves X, and suitable clutches and treadles, whereby as the drum is turned by the treadles the spring will be made to turn the axle forward, substantially as described.

2. The combination of the drum G, provided with the sleeve X, having the recesses 8 cut in opposite sides, with the clutches $l$, provided with suitable dogs and springs, and the pinion 7, the segments $f^2$, treadles T, pulley $J^2$, and a connecting cord, rope, or chain for uniting the treadles together, substantially as set forth.

3. In a velocipede, the seat-board A, made wide and concave at its front end and decreasing in width toward its rear end, so as to form the saddle O, and having the vertical sides upon which the segments $f^2$ are pivoted, substantially as specified.

4. The combination of the seat-board A and concavo-convex plate B, fitting in its front end, the post C, guiding-lever D, brake-block $e$, rod I, spring $c$, and guiding-wheel F, the parts being arranged and combined to operate substantially as shown and described.

In testimony that I claim the foregoing I have hereunto set my hand this 18th day of June, 1880.

BARTHOLOMA RIEDER.

Witnesses:
JAMES MESKELL,
T. F. LEHMANN.